(12) United States Patent
Hirano et al.

(10) Patent No.: US 7,894,118 B2
(45) Date of Patent: Feb. 22, 2011

(54) ELECTROCHROMIC COMPOUND, ELECTROCHROMIC COMPOSITION AND DISPLAY DEVICE

(75) Inventors: Shigenobu Hirano, Yokohama (JP); Takeshi Shibuya, Tsukuba (JP); Hiroshi Kondo, Yokohama (JP); Yuki Nakamura, Machida (JP); Yukiko Abe, Yokohama (JP); Tohru Yashiro, Yokosuka (JP)

(73) Assignee: Ricoh Company, Ltd., Tokyo (JP)

( * ) Notice: Subject to any disclaimer, the term of this patent is extended or adjusted under 35 U.S.C. 154(b) by 36 days.

(21) Appl. No.: 12/401,156

(22) Filed: Mar. 10, 2009

(65) Prior Publication Data

US 2009/0231663 A1 Sep. 17, 2009

(30) Foreign Application Priority Data

Mar. 11, 2008 (JP) ............................. 2008-061622

(51) Int. Cl.
*G02F 1/153* (2006.01)
*G02F 1/15* (2006.01)
*G02B 26/00* (2006.01)

(52) U.S. Cl. ....................... 359/273; 359/296; 359/270; 359/265

(58) Field of Classification Search ................. 252/500, 252/583, 586; 359/265, 267, 268, 273, 274, 359/296; 558/190; 560/44
See application file for complete search history.

(56) References Cited

U.S. PATENT DOCUMENTS

| | | | |
|---|---|---|---|
| 7,029,833 B2 | 4/2006 | Takahashi et al. | |
| 7,333,259 B2 | 2/2008 | Hirano et al. | |
| 7,474,322 B2 | 1/2009 | Takahashi et al. | |
| 7,489,432 B2 | 2/2009 | Shibuya et al. | |
| 7,525,716 B2 * | 4/2009 | Hirano et al. | 359/270 |
| 7,663,797 B2 * | 2/2010 | Hirano et al. | 359/265 |
| 2006/0204866 A1 | 9/2006 | Hirano et al. | |
| 2008/0013152 A1 | 1/2008 | Hirano et al. | |
| 2008/0112033 A1 | 5/2008 | Shibuya et al. | |

FOREIGN PATENT DOCUMENTS

EP          1 887 416 A1     2/2008

(Continued)

OTHER PUBLICATIONS

U.S. Appl. No. 12/401,225, filed Mar. 10, 2009, Shibuya, et al.

*Primary Examiner*—David N Spector
(74) *Attorney, Agent, or Firm*—Oblon, Spivak, McClelland, Maier & Neustadt, L.L.P.

(57) ABSTRACT

An electrochromic compound having in the molecule at least an adsorbable group, a redox chromophore and a spacer portion, and represented by the following General Formula (1):

General Formula (1)

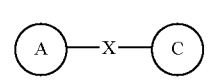

wherein A represents the adsorbable group, C represents the redox chromophore, and X represents the spacer portion represented by the following formula;

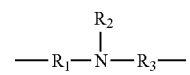

wherein $R_1$ and $R_3$ each represent an aliphatic hydrocarbon group or an aromatic derivative group, $R_2$ represents a hydrogen atom or a monovalent group.

15 Claims, 1 Drawing Sheet

FOREIGN PATENT DOCUMENTS

| | | |
|---|---|---|
| EP | 2 100 938 A1 * | 9/2009 |
| JP | 62-71934 | 4/1987 |
| JP | 4-320482 | 11/1992 |
| JP | 2001-510590 | 7/2001 |
| JP | 2002-328401 | 11/2002 |
| JP | 2003-161964 | 6/2003 |
| JP | 2004-151265 | 5/2004 |
| JP | 2004-520621 | 7/2004 |
| JP | 2004-361514 | 12/2004 |
| JP | 2004-536344 | 12/2004 |
| JP | 2006-71767 | 3/2006 |
| JP | 2006-106669 | 4/2006 |
| JP | 3955641 | 5/2007 |
| WO | WO 94/15246 | 7/1994 |
| WO | WO 98/35267 | 8/1998 |
| WO | WO 02/086612 A1 | 10/2002 |
| WO | WO 03/009059 A1 | 1/2003 |

* cited by examiner

ELECTROCHROMIC COMPOUND, ELECTROCHROMIC COMPOSITION AND DISPLAY DEVICE

BACKGROUND OF THE INVENTION

1. Field of the Invention

The present invention relates to a display device, specifically to a structure of display device using a color forming material capable of repeatedly changing its color by a redox reaction; a reflective display; and an electronic paper.

2. Description of the Related Art

Recently, much research effort has been made to electronic paper as an electronic medium that is expected to displace paper. In contrast to conventional displays including CRTs and liquid crystal displays (LCDs), electronic paper requires the following characteristics: being a reflective display device; high white reflectivity and contrast ratio; high definition display; memory effect; low-voltage drive capability; slimness; lightness; and inexpensiveness, etc. In terms of its display characteristics, in particular, it is required that electronic paper has as excellent white reflectivity and contrast ratio as paper does, and the development of a display device offering all of these characteristics is far from easy. In addition, since a conventional display, paper medium, is generally a full-color display, colorization of electronic paper has strongly been demanded.

Techniques for electronic paper capable of displaying colors which have been so far proposed include a medium in which a color filter is formed on a reflective liquid crystal device, which has already been commercialized. The media, however, have the following problems: low light-utilizing efficiency due to the use of a polarizing plate; being incapable of displaying colors other than dark white; and low contrast ratio because of incapability of displaying black color.

As a bright reflective display device, there has been an electrophoretic device whose principle is to migrate charged white particles and charged black particles in an electric field. In such a device, however, it is practically difficult to completely reverse the white particles and the black particles so that it is hard to simultaneously satisfy high white reflectivity and high contrast ratio. Japanese Patent Application Laid-Open (JP-A) Nos. 2003-161964 and 2004-361514 disclose a reflective color display medium in which a color filter is formed on a electrophoretic device. However, it is clear that an excellent image quality cannot be obtained by forming a color filter on a display medium having low white reflectivity and low contrast ratio. JP-A Nos. 2004-520621 and 2004-536344 disclose an electrophoretic device which performs colorization by migrating particles having a plurality of colors. These devices cannot solve the above-mentioned problems in principle, and cannot simultaneously fulfill high white reflectivity and high contrast ratio.

A phenomenon in which electrochromic materials applied with a voltage show a reversible color change during the electrochemical redox reaction is called electrochromism. Electrochromic display device, which utilizes color change in electrochromic compounds that cause such a phenomenon, has emerged as a candidate for electrochromic paper because it serves as a reflective display device, has high white reflectivity as well as a memory effect, and can be driven at a low voltage. For example, JP-A Nos. 2001-510590, 2002-328401 and 2004-151265 disclose electrochromic devices in which an electrochromic compound is attached to the surface of semiconductor fine particles made of, for example, titanium oxide. Such electrochromic devices have effective structures because they can lower the amount of electric charge necessary for the drive, and they can accelerate coloration/decoloration reaction. However, the electrochromic compounds illustrated in the two publications form colors such as blue and green, but cannot form three primary colors, i.e., yellow, magenta and cyan, which are necessary for producing a full color display.

JP-A Nos. 62-71934 and 2006-71767 disclose aromatic dicarboxylic acid ester derivatives which are electrochromic compounds forming the three primary colors, i.e., yellow, magenta and cyan. Although these electrochromic compounds can form the three primary colors, they have no memory effect, so that when voltage-applying is stopped, these compounds lose their colors in about one second.

An electronic paper is supposed to be not used in the state of connecting continuously to a power source, but to be used with an internal battery. Accordingly, a display device of lower power consumption is demanded. If a display device has no memory performance, it needs continuous power supply for producing colors. But if a display device has memory performance, there is no need to supply power while it maintains to produce a color. Thus since the greater the memory performance, the lower the power consumption can be, so that enhancement of memory performance is important problem.

BRIEF SUMMARY OF THE INVENTION

The present invention has been accomplished in view of the above-mentioned conditions and problems of the conventional art, and aims at improving memory performance of an electrochromic compound and a reflective display device using the compound.

The above problems are solved by the following aspects of the present invention.

<1> An electrochromic compound having in the molecule at least an adsorbable group, a redox chromophore and a spacer portion, and represented by the following General Formula (1);

General Formula (1)

wherein A represents the adsorbable group, C represents the redox chromophore, and X represents the spacer portion represented by the following formula;

wherein $R_1$ and $R_3$ each represent an aliphatic hydrocarbon group or an aromatic derivative group, $R_2$ represents a hydrogen atom or a monovalent group.

<2> The electrochromic compound according to <1>, wherein the redox chromophore C includes a monovalent structure selected from the group consisting of the following formulae (2a), (3a) and (4a) or a divalent structure selected from the group consisting of the following formulae (2b), (3b) and (4b);

General Formula (2a)

General Formula (2b)

General Formula (3a)

General Formula (3b)

General Formula (4a)

General Formula (4b)

wherein $X_1$ to $X_{16}$ are the same or different and each represent a hydrogen atom or a monovalent substituent, $R_4$, $R_6$ and $R_8$ are the same or different, and each represent a divalent organic residual group, $R_5$, $R_7$ and $R_9$ are the same or different, and each represent a monovalent or divalent organic residual group, and $Y_1$ and $Y_2$ each represent an oxygen atom or a divalent group containing a nitrogen atom.

<3> The electrochromic compound according to any one of <1> and <2>, wherein the adsorbable group A is a phosphonic acid group or an organic group containing a phosphonic acid group.

<4> The electrochromic compound according to any one of <1> and <2>, wherein the adsorbable group A is a silyl group or an organic group containing a silyl group.

<5> An electrochromic composition comprising:

a conductive or semi-conductive fine particle, and the electrochromic compound according to any one of <1> to <4>, which is carried by the conductive or semi-conductive fine particle.

<6> A display device comprising:

a display electrode, a counter electrode which is placed opposite to the display device with a space, and an electrolyte placed in the space between the display electrode and the counter electrode, wherein the display electrode has on a surface facing the counter electrode at least one of the electrochromic compound according to any one <1> to <4> and the electrochromic composition according to <5>.

The aspect of claim 1 enables to produce an electrochromic compound having an amine derivative and a display device having an increased memory performance.

The aspect of claim 2 enables to produce an electrochromic compound capable of generating the three primary colors and a full-color display device having an increased memory performance.

The aspect of claim 3 enables to produce economically a display device having an increased durability and increased memory performance.

The aspect of claim 4 enables to produce a display device a display device having a greatly increased durability and increased memory performance.

The aspect of claim 5 enables to produce a display device having an increased memory performance and causing coloring or decoloring reaction in high efficiency.

The aspect of claim 6 enables to produce a display device of low power consumption.

DETAILED DESCRIPTION OF THE INVENTION

The electrochromic compound of the present invention has in the molecule at least an adsorbable group, a redox chromophore and a spacer portion, and represented by the following General Formula (1).

General Formula (1)

In General Formula (1), A represents the adsorbable group, C represents the redox chromophore, and X represents the spacer portion represented by the following formula:

wherein $R_1$ and $R_3$ each represent an aliphatic hydrocarbon group or an aromatic derivative group, $R_2$ represents a hydrogen atom or a monovalent group.

The redox chromophore C is a moiety which produces or vanishes colors due to a redox reaction caused by donating or receiving electrons. The adsorbable group plays a role in making the compound adsorb or bind to the electrode.

Figure 1A:
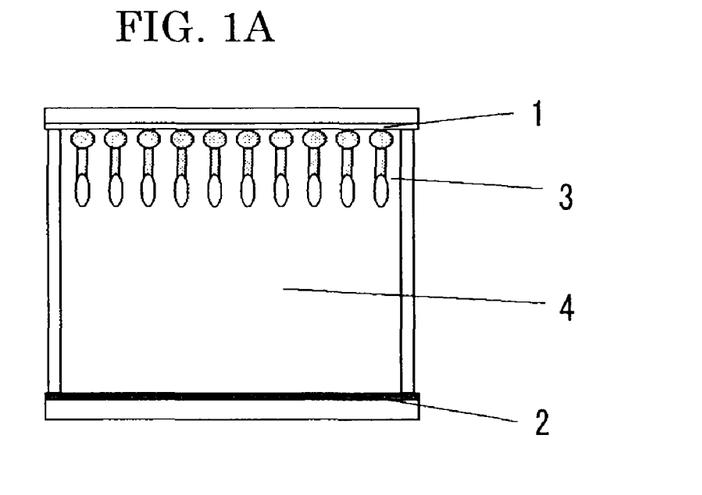
FIG. 1A shows an example of an illustrative structure of a display device using the electrochromic compound of the present invention.

An example of the display device using the electrochromic compound of the present invention is illustrated in FIG. 1A. The electrochromic compound adsorbs or binds to the electrode through the adsorbable group A. When a voltage is applied to the display device, electrons transfer from the electrode to the electrochromic compound and then move onto the adsorbable group A and the spacer portion X, and reach the redox chromophore C, where a reduction reaction occurs to change the color. On the contrary, when a reverse voltage is applied, electrons move from the redox chromophore to the electrode through the spacer portion and the adsorbable group, so that in the redox chromophore the color is returned to the original color shown when no voltage is applied.

If the display device is left to stand as is after stopping the voltage application, the redox chromophore holds electrons therein so as to maintain the reduction state. This is called a memory effect of an electrochromic compound. This memory effect, however, does not last forever, because some electrons on the electrochromic compound tend to move to the electrode through the spacer portion and an adsorbable group, or to the electrolyte surrounding the redox chromophore. Especially, in a compound structurally unstable to maintain the reduction state, electrons easily move to the electrode, leaving little or no memory effect.

In order to improve the memory effect of the electrochromic compound, the present inventors have developed a compound in which a nitrogen atom-containing group having an aliphatic hydrocarbon group or an aromatic derivative group is present between an adsorbable group and a redox chromophore. Briefly, they have developed a compound having a spacer portion X containing an amine derivative group. In the General Formula (1), $R_1$ and $R_3$ each represent an aliphatic hydrocarbon group or an aromatic derivative group, and $R_2$ represents a hydrogen atom or a monovalent group. Examples of the monovalent group include F, Cl, Br, I, $NO_2$, $NH_2$, or an alkyl group such as a methyl, ethyl or propyl group.

A diphenyl amine derivative, a triethyl amine derivative, dimethyl amine derivative, trimethyl amine derivative, and the like are commonly employed as an electron hole transport material, which have effective structures for blocking electrons. By introducing any of these structures in between the electrode and the redox chromophore, the flow of electrons from the redox chromophore in the reduction state to the electrode is blocked so that the memory performance of the display device is enhanced in a double-digit level.

The adsorbable group A is not particularly limited so long as it can adsorb or bind to the electrodes. As an adsorptive structure, an acid structure such as a phosphonic acid group, a carboxylic acid group, sulfonic acid group, salicylic acid group, or phosphoric acid group is excellent in adsorption performance. Also, a silyl group or silanol group exhibits a strong bond because it binds chemically to the electrode. Thus it is preferable to use the acid structure such as a phosphonic acid group, a carboxylic acid group, sulfonic acid group, salicylic acid group, phosphoric acid group, or a silyl group, or a group containing both such acid group portion and silyl group portion.

The redox chromophore C is not particularly limited so long as it is a residual group of the ordinary electrochromic compound. Examples include a residual group of a phthalic acid compound, a viologen compound, a styryl compound, a phenothiazine compound, an anthraquinone compound, pyrazoline compound, fluorane compound, and phthalocyanine compound.

Preferable examples of the amine derivative residual group as a spacer portion X are shown below. However, these examples do not impose any limitation to the structure of the spacer portion X in the present invention.

In the present invention, the adsorbable group A, the spacer portion X and the redox chromophore C may bind to each other directly or through the intermediary of another structure or element such as an alkyl group between them. In addition, another structure may bind to the terminal of the redox chromophore C.

Figure 1B:
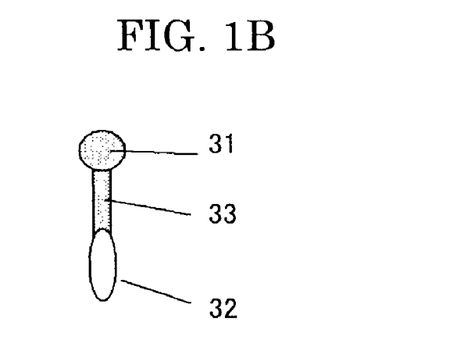
FIG. 1B shows an enlarged view of the electrochromic compound 3 in FIG. 1A.

FIG. 1A shows an example of the general configuration of the display device using the electrochromic compound of the present invention. In FIG. 1A, a reference numeral 1 denotes a display electrode; 2, a counter electrode; 3, an electrochromic compound; and 4, an electrolyte placed between the two electrodes. FIG. 1B is an enlarged view of the electrochromic compound 3 shown in FIG. 1A. In FIG. 1B, a reference numeral 31 denotes an adsorbable group; 32, a redox chromophore; and 33, a spacer portion.

The electrochromic compound 3 is disposed onto one surface of the display electrode 1, the surface facing the counter electrode 2. Examples of the method of forming the layer include an immersion method, a dipping method, a vapor deposition method, a spin coat method, a printing method, and inkjet method. Since the electrochromic compound 3 of the present invention has an adsorbable group 31, the electrochromic compound 3 can adsorb or attach to the display electrode 1.

As for the display electrode, it is preferable to use a transparent conductive substrate. The transparent conductive substrate is preferably a glass or plastic film. A transparent conductive film made of ITO, FTO, ZnO or the like is formed on the substrate by coating. Plastic film substrate is preferable because it can provide a light, flexible display device.

The counter electrode is also formed by coating a transparent conductive film made of ITO, tin oxide, zinc oxide, or the like, or a conductive metal film made of zinc, platinum, or the like on a substrate. The substrate for the counter electrode is preferably a glass plate or a plastic film.

Examples of the electrolyte include a solution in which a lithium salt such as lithium perchlorate or lithium fluoroborate is dissolved in an organic solvent such as acetonitrile or propylene carbonate; and a solid such as perfluorosulfonic acid-based polymer film. The solution electrolyte has an advantage of high ionic conductance. The solid electrolyte causes no degradation and so is suitable for producing highly durable device.

When the display device of the present invention is used as a reflective display device, it is preferable to place a white reflective layer between the display electrode and the counter electrode. The easiest way to form the white reflective layer is to disperse white pigment particles in a resin and then apply the dispersion product to the counter electrode. Examples of the white pigment particles include a fine particle made of commonly used metal oxides such as titanium oxide, aluminum oxide, zinc oxide, silicon oxide, cesium oxide, and yttrium oxide.

The method of driving the display device may be selected from any known methods capable of applying a voltage and an electric current. Passive driving method enables to produce an inexpensive display device. Active driving method enables to produce a high definition, high speed display device. The active driving can be performed by forming an active driving element on the substrate of the counter electrode.

As mentioned above, the redox chromophore C is not structurally limited, but the structures derived from any of the compounds represented by the General Formulae (2a) to (4b) consisting of a monovalent structure selected from the group consisting of General Formulae (2a), (3a) and (4a) or a divalent structure selected from the group consisting of General Formulae (2b), (3b) and (4b) are useful in a full-color display because these structures are transparent when the color is vanished, while they show three primary colors of magenta, yellow and cyan when the color is produced.

In the General Formulae, $X_1$ to $X_{16}$ are the same or different and each represent a hydrogen atom or a monovalent substituent. Preferable examples of the monovalent substituent include F, Cl, Br, I, $NO_2$, and $NH_2$, and an alkyl group such as methyl, ethyl and propyl group. $R_4$, $R_6$ and $R_8$ are the same or different, and each represent a divalent organic group, $R_5$, $R_7$ and $R_9$ are the same or different, and each represent a monovalent organic group or divalent organic residual group. Examples of the monovalent organic group include an alkyl group such as a methyl group, an ethyl group, and a propyl group; an aryl group such as a phenyl group; and an aralkyl group such as a benzyl group. Examples of the divalent organic residual group include an alkylene group such as a methylene group, an ethylene group, and a propylene group; an arylene group such as a phenylene group; an arynyl group such as benzynyl group.

$Y_1$ and $Y_2$ each represent an oxygen atom or a divalent group containing a nitrogen atom. Having searched for various structures, the present inventors have found that in the structures of aromatic dicarboxylic acid derivatives having any of the General Formulae (2a), (2b), (3a), and (3b), only those with an ester structure at one end and with an ester or an amide structure at another end can cause an electrochromic reaction.

Another aspect of the electrochromic compound of the present invention lies in that the adsorbable group A is a phosphonic acid group or a group containing a phosphonic acid group. Since a phosphonic acid group produces a strong adsorption reaction with a hydroxyl group, the phosphonic acid group adsorbs firmly onto the electrode. Accordingly, the group can hardly be removed from the electrode so that durability of the display device is enhanced. Moreover, since the phosphonic acid group is easy to synthesize, costs for the materials can be lowered.

Another aspect of the electrochromic compound of the present invention lies in that the adsorbable group A is a silyl group or a group containing a silyl group. A silyl group chemically reacts with a hydroxyl group to form a silanol bond. Since a silanol bond is a chemical bond, it can attach to the electrode more strongly than in the adsorption reaction, and so it can improve the durability of the display device.

The electrochromic compound of the present invention can be synthesized in a manner similar to the method as disclosed in the above-referenced JP-A No. 2006-71767.

The electrochromic compound of the present invention can be used, as such, for a display device through the adsorption or the binding thereof to the electrode. The electrochromic compound can also be used in the form in which the electrochromic compound is carried on any conductive or semi-conductive fine particles. More specifically, the electrochromic compound can be used as a structure of a composition where the electrochromic compounds are adsorbed or bound to the surfaces of conductive or semi-conductive fine particles having a particle diameter of about 5 nm to about 50 nm.

Figure 2:
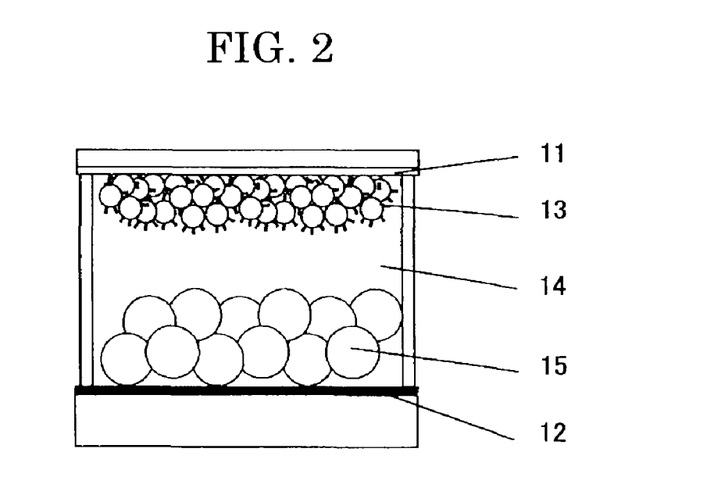
FIG. 2 shows an example of an illustrative structure of a display device using the electrochromic composition of the present invention.

FIG. 2 shows an example of the general configuration of the display device using the electrochromic composition of the present invention. In FIG. 2, reference numeral 11 denotes a display electrode; 12, a counter electrode; 13, an electrochromic composition; 14, an electrolyte placed between the two electrodes; and 15, a white color-reflective layer.

Since fine particles have a large specific surface area, they can carry extremely large amount of the electrochromic compounds thereon. Accordingly, by coating the electrochromic composition onto the surface of the electrode, a great amount of the electrochromic compounds can be fixed on the electrode, so that the display device efficiently performs coloration or decoloration reaction, and power consumption can be lowered.

The fine particles are of a conductive or semi-conductive nature, electrons flow from the electrode to the redox chromophore C through the fine particles, the adsorbable group A and a spacer portion X. Accordingly, in the electrochromic composition, flow of electrons from the redox chromophore in the state of reduction to the electrode can be blocked by the spacer portion, resulting in the increase of the memory effect.

Although the material or form of the conductive or semi-conductive fine particles is not particularly limited so far as the electrochromic compounds can adsorb thereon, it is preferable to use metal oxides.

Specific examples of the conductive or semi-conductive fine particles include, without any limitation to, a metal oxide containing as a main component, any one of titanium oxide, zinc oxide, tin oxide, alumina, zirconia, ceria, silica, yttria, polonia, magnesia, strontium titanate, potassium titanate, barium titanate, calcium titanate, calcia, ferrite, hafnia, tungsten trioxide, iron oxide, cupper oxide, nickel oxide, cobalt oxide, barium oxide, strontium oxide, vanadium oxide, indium oxide, aluminosilicate, and calcium phosphate. These metal oxides may be used singly or in combination of two or more. Preferably used are titanium oxide, zinc oxide, alumina, zirconia, iron oxide, magnesium oxide, indium oxide, and tungsten oxide. Of these, titanium oxide is more preferable in terms of electric and physical properties.

EXAMPLES

Example 1

The electrochromic compound having the structure represented by the Formula (7) shown below was obtained according to the following synthetic process.

Bis(4-formylphenyl)phenylamine was reduced in ethanol with 2 equivalents of sodium borohydride to obtain bis(4-hydroxymethylphenyl)phenylamine. The obtained bis(4-hydroxymethylphenyl)phenylamine was reacted with equimolar p-toluenesulfonylchloride to replace a hydroxyl group at one end with a toluenesulfonyl group, and then the resultant compound was reacted with trimethylphosphite to yield a triphenylamine phosphate derivative having the structure represented by the Formula (6), as an intermediate compound.

Formula (6)

The compound of Formula (6) was reacted with terephthalic acid monomethyl chloride in a THF solvent, and then the phosphonic acid ester was hydrolyzed with a diluted hydrochloric acid, whereby the compound having the structure represented by the Formula (7) was yielded.

Formula (7)

Example 2

0.2 M of the compound of Formula (7) obtained in Example 1 was dissolved in ethanol, and to the resultant solution, a glass base plate covered wholly with a tin oxide transparent electrode film was immersed for 24 hours, to adsorb the compound of Formula (7) to the surface of the electrode film, whereby a display electrode was prepared.

Meanwhile, the glass base plate covered wholly with a tin oxide transparent electrode film was placed in a 0.2% by mass aqueous solution of hexachloroplatinic acid and a constant electric flow of 1 mA/cm$^2$ was applied for 30 seconds to deposit a platinum film on the surface, whereby a counter electrode was prepared.

The display electrode and the counter electrode were attached together by the intermediary of a 100 μm thick spacer to obtain a cell. Into the cell, an electrolyte solution prepared by dissolving 0.2 M of tetrabutylammonium chloride in dimethylformamide was poured, whereby a display device was produced.

An anode and a cathode were respectively connected to the display electrode and the counter electrode, followed by impression of a voltage of 3 V for one second. The display device produced magenta, and the coloring state continued for about 100 seconds after the impression of the voltage.

Comparative Example 1

A display device was prepared in the same manner as in Example 2, except that the electrochromic compound was changed to the compound having the structure represented by the Formula (8), which has no triphenylamine structure.

Formula (8)

An anode and a cathode were respectively connected to the display electrode and the counter electrode, followed by impression of a voltage of 3 V for one second. The display device produced magenta, but the color disappeared in about 1 second after the impression of the voltage.

Example 3

The compound of Formula (6) obtained in Example 1 was reacted with 4,4-biphenylcarboxylic acid monoethylchloride in a THF solvent, and then the resultant phosphonate was hydrolyzed with a diluted hydrochloric acid, whereby the compound having the structure represented by Formula (9) was yielded.

An display device was produced in the same manner as in Example 2 except that the electrochromic compound was replaced lo with the compound of Formula (9). An anode and a cathode were respectively connected to the display electrode and the counter electrode, followed by impression of a voltage of 3 V for one second. The display device produced yellow, and the coloring state continued for about 100 seconds after the impression of the voltage.

Example 4

The electrochromic compound having the Formula (11) shown below was obtained according to the following synthetic process.

Bis(4-formylphenyl)phenylamine was reduced in ethanol with 2 equivalents of sodium borohydride to obtain bis(4-hydroxymethylphenyl)phenylamine. The bis(4-hydroxymethylphenyl)phenylamine was reacted with equimolar terephalic acid monomethyl chloride in a THF solvent to yield an intermediate compound having the structure represented by Formula (10).

Formula (9)

Formula (10)

Using a Jones reagent, the hydroxy group of the Formula (10) was changed to a carboxy group, and the resultant compound was subjected to an amide reaction with 3-aminopropyltrimethoxysilane to obtain the compound of Formula (11).

Formula (11)

A display device was produced in the same manner as in Example 2 except that the electrochromic compound was replaced with the compound of Formula (11). An anode and a cathode were respectively connected to the display electrode and the counter electrode, followed by impression of a voltage of 3 V for one second. The display device produced magenta, and the coloring state continued for about 100 seconds after the impression of the voltage.

Comparative Example 2

A display device was produced in the same manner as in Example 2 except that the electrochromic compound was replaced with the compound of Formula (12) which has no triphenylamine structure.

Formula (12)

An anode and a cathode were respectively connected to the display electrode and the counter electrode, followed by impression of a voltage of 3 V for one second. The display device produced magenta, but the color disappeared in about 1 second after the impression of the voltage.

Example 5

0.2 M of the compound of Formula (11) was dissolved in 0.02 M aqueous acetic acid solution, and to the resultant solution, titanium oxide fine particles having a primary diameter of 6 nm was added in a ratio of 20% by mass. The mixture was subjected to an ultrasonic dispersion for 5 hours so that the compound of Formula (11) was attached to the surface of titanium oxide fine particles. The aqueous acetic acid solution was filtered and the titanium oxide fine particles were dispersed again in ethanol. The resultant ethanol dispersion liquid was spin-coated to a glass plate whole surface of which was covered with tin oxide transparent electrode film, and the coated product was dried at 120° C. to obtain a display electrode. A display device was produced in the same manner as in Example 2.

An anode and a cathode were respectively connected to the display electrode and the counter electrode, followed by impression of a voltage of 3 V for one second. The display device produced magenta, and the coloring state continued for about 200 seconds after the impression of the voltage.

What is claimed is:

1. An electrochromic compound having in the molecule at least an adsorbable group, a redox chromophore and a spacer portion, and represented by the following General Formula (1):

General Formula (1)

wherein A represents the adsorbable group, C represents the redox chromophore, and X represents the spacer portion represented by the following formula:

wherein $R_1$ and $R_3$ each represent an aliphatic hydrocarbon group or an aromatic derivative group, $R_2$ represents a hydrogen atom or a monovalent group.

2. The electrochromic compound according to claim 1, wherein the redox chromophore C comprises a monovalent structure selected from the group consisting of the following formulae (2a), (3a) and (4a), or a divalent structure selected from the group consisting of the following formulae (2b), (3b) and (4b):

General Formula (2a)

General Formula (2b)

General Formula (3a)

General Formula (3b)

General Formula (4a)

General Formula (4b)

wherein $X_1$ to $X_{16}$ are the same or different and each represent a hydrogen atom or a monovalent substituent, $R_4$, $R_6$ and $R_8$ are the same or different, and each represent a divalent organic group, $R_5$, $R_7$ and $R_9$ are the same or different, and each represent a monovalent organic group or divalent organic group, and $Y_1$ and $Y_2$ each represent an oxygen atom or a divalent group containing a nitrogen atom.

3. The electrochromic compound according to claim 1, wherein the adsorbable group A is a phosphonic acid group or an organic group containing a phosphonic acid group.

4. The electrochromic compound according to claim 1, wherein the adsorbable group A is a silyl group or an organic group containing a silyl group.

5. An electrochromic composition comprising:
a conductive or semi-conductive fine particle, and
an electrochromic compound,
wherein the conductive or semi-conductive fine particle carries the electrochromic compound,
wherein the electrochromic compound is represented by the following General Formula (1):

General Formula (1)

wherein A represents an adsorbable group, C represents a redox chromophore, and X represents a spacer portion represented by the following formula:

wherein $R_1$ and $R_3$ each represent an aliphatic hydrocarbon group or an aromatic derivative group, $R_2$ represents a hydrogen atom or a monovalent group.

6. A display device comprising:
a display electrode,
a counter electrode which is placed opposite to the display device with a space, and
an electrolyte placed in the space between the display electrode and the counter electrode,
wherein the display electrode has on a surface facing the counter electrode at least one of an electrochromic compound represented by the following General Formula (1) and an electrochromic composition carrying the electrochromic compound:

General Formula (1)

wherein A represents an adsorbable group, C represents a redox chromophore, and X represents a spacer portion represented by the following formula:

wherein $R_1$ and $R_3$ each represent an aliphatic hydrocarbon group or an aromatic derivative group, $R_2$ represents a hydrogen atom or a monovalent group.

7. The electrochromic compound according to claim 2, wherein the redox chromophore C comprises the structure of formula (2a).

8. The electrochromic compound according to claim 2, wherein the redox chromophore C comprises the structure of formula (3a).

9. The electrochromic compound according to claim 2, wherein the redox chromophore C comprises the structure of formula (4a).

10. The electrochromic compound according to claim 2, wherein the redox chromophore C comprises the structure of formula (2b).

11. The electrochromic compound according to claim 2, wherein the redox chromophore C comprises the structure of formula (3b).

12. The electrochromic compound according to claim 2, wherein the redox chromophore C comprises the structure of formula (4b).

13. The electrochromic compound according to claim 2, wherein the adsorbable group A is a phosphonic acid group or an organic group containing a phosphonic acid group.

14. The electrochromic compound according to claim 2, wherein the adsorbable group A is a silyl group or an organic group containing a silyl group.

15. The electrochromic compound according to claim 1, wherein the spacer portion X is selected from the following groups:

* * * * *